United States Patent
Tu et al.

(10) Patent No.: US 9,779,126 B2
(45) Date of Patent: Oct. 3, 2017

(54) HYBRID DATABASE UPGRADE MIGRATION

(71) Applicants: Enping Tu, Cupertino, CA (US);
Yanlun Ma, Saratoga, CA (US);
Yung-Yin Chen, Cupertino, CA (US)

(72) Inventors: Enping Tu, Cupertino, CA (US);
Yanlun Ma, Saratoga, CA (US);
Yung-Yin Chen, Cupertino, CA (US)

(73) Assignee: SAP SE, Walldorf (DE)

(*) Notice: Subject to any disclaimer, the term of this patent is extended or adjusted under 35 U.S.C. 154(b) by 278 days.

(21) Appl. No.: 14/304,944

(22) Filed: Jun. 15, 2014

(65) Prior Publication Data
US 2015/0363452 A1    Dec. 17, 2015

(51) Int. Cl.
*G06F 17/30* (2006.01)

(52) U.S. Cl.
CPC .. *G06F 17/30356* (2013.01); *G06F 17/30297* (2013.01)

(58) Field of Classification Search
CPC ................................................ G06F 17/30356
See application file for complete search history.

(56) References Cited

U.S. PATENT DOCUMENTS

| | | | | | |
|---|---|---|---|---|---|
| 6,119,130 | A | * | 9/2000 | Nguyen | G06F 17/30297 707/695 |
| 6,460,052 | B1 | * | 10/2002 | Thomas | G06F 17/30309 707/695 |
| 7,792,800 | B1 | * | 9/2010 | Carson, Jr. | H04L 41/082 707/609 |
| 8,571,882 | B1 | * | 10/2013 | Teitelbaum | G06F 17/30575 705/2 |
| 2014/0189677 | A1 | * | 7/2014 | Curzi | G06F 8/65 717/171 |
| 2014/0337282 | A1 | * | 11/2014 | Mesika | G06F 17/30289 707/609 |

* cited by examiner

*Primary Examiner* — Etienne Leroux
*Assistant Examiner* — Dara J Glasser
(74) *Attorney, Agent, or Firm* — Buckley, Maschoff & Talwalkar LLC

(57) ABSTRACT

According to some embodiments, it may be determined that a plurality of hybrid database version upgrade migrations are to be performed. Each upgrade migration may include, for example, a schema change portion and a data change portion. A first database migration tool instance may be automatically run to perform the upgrade migration schema change portions. Similarly, a second database migration tool instance may be automatically run to perform the upgrade migration data change portions, wherein the second instance is not run until the first instance is complete.

19 Claims, 8 Drawing Sheets

HYBRID DATABASE UPGRADE MIGRATION

FIELD

Some embodiments relate to database systems. In particular, some embodiments are associated with hybrid database version upgrade migrations.

BACKGROUND

New database versions may occasionally be provided. For example, a new database version may add another column to a table or fix a problem that was detected with respect to the database. In some cases, conflicting database versions may cause updates to fail. Manually coordinating the migration of new database versions can be a time consuming and error-prone task, especially when a substantial number of versions are involved. For example, new versions may be provided on a daily basis in a development or testing environment. As a result, systems and methods to automatically and accurately migrate database version may be desired.

DETAILED DESCRIPTION

Figure 1:
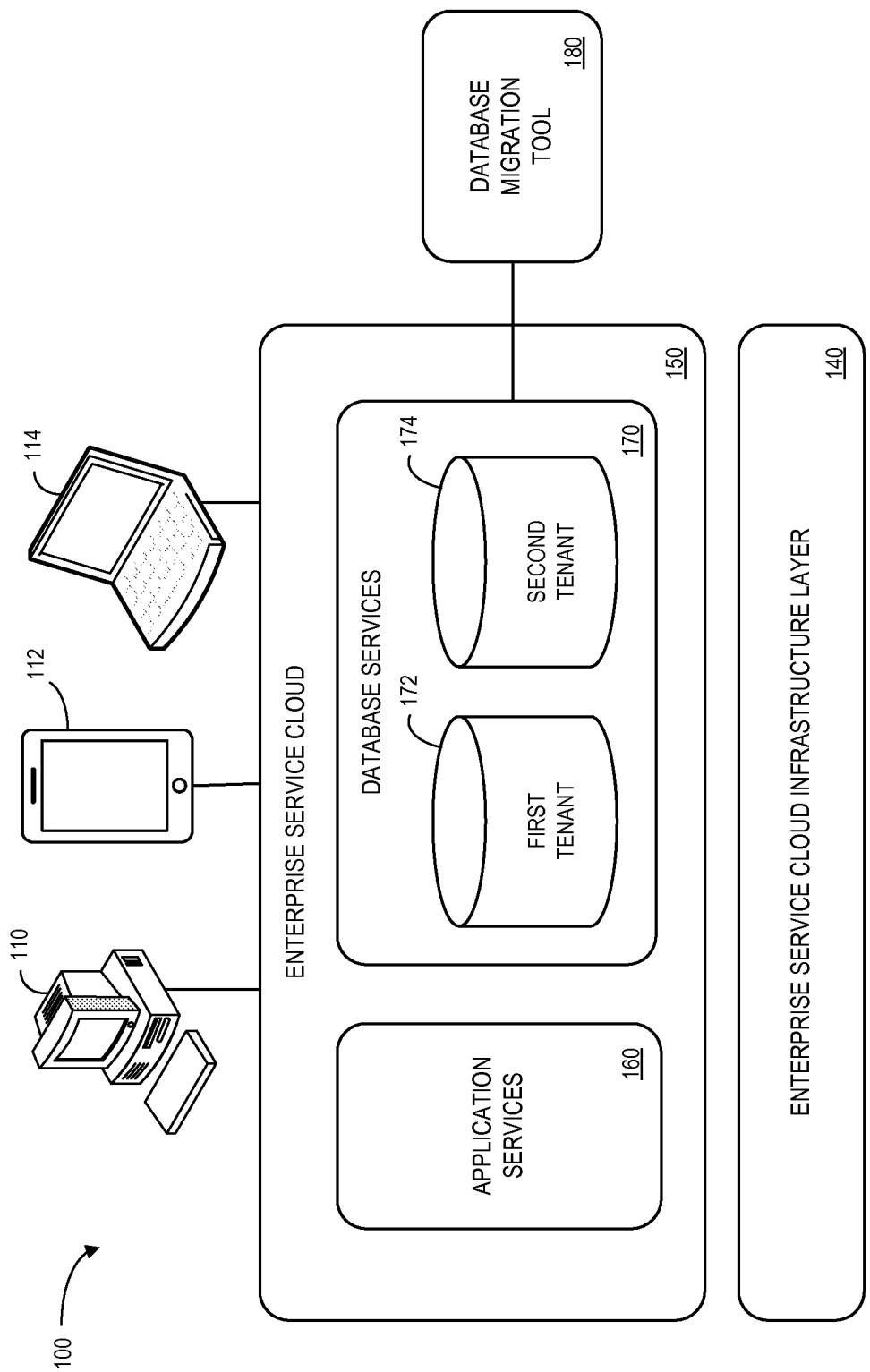
FIG. 1 is a high-level block diagram of a system to facilitate hybrid database version upgrade migrations according to some embodiments.

FIG. 1 is a high-level block diagram of a system 100 to facilitate hybrid database version upgrade migrations according to some embodiments. The system 100 may be associated with, for example, an enterprise service cloud 150 based environment accessed by user devices 110, 112, 114. The enterprise service cloud 150 may be supported by an enterprise service cloud infrastructure layer 140 (e.g., a private and/or public cloud infrastructure) to provide application services 160 (e.g., native applications, Java cloud applications, portals, mobile device support, collaboration features, and/or integration abilities) and database services 170 (e.g., in-memory, transactional, analytics, text, predictive, planning, etc.). Note that the database services 170 may support a first tenant 172, a second tenant 174, etc. By way of example only, the system 100 may be associated with a HANA cloud platform from SAP®.

Note that various elements of database services 170 may occasionally need to be upgraded to newer versions. For example, a patch may fix an existing problem or a new release may add a new feature. To facilitate movement to the newer versions, a database migration tool 180 may be provided. By way of example only, the FLYWAY database migration tool from GOOGLE® may be used, although embodiments may be associated with other database migration tools or platforms.

Note that when upgrading a cloud solution, both the solution binary files and the application database itself may need to be updated. For example, a database upgrade may include both pure a Structured Query Language ("SQL") update and data migration (resulting in a "hybrid" database migration). Note that an SQL update may typically be represented with an ordered set of SQL files and data migration may be manipulated by code (e.g., by migrating data with Java code).

Figure 2:
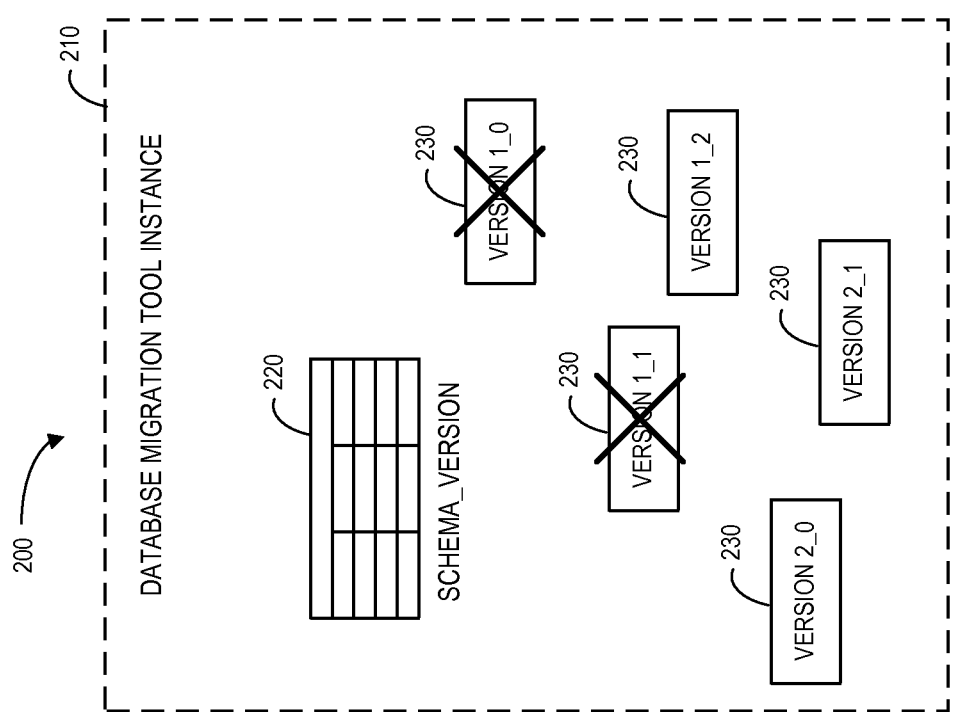
FIG. 2 is an example of a database migration tool instance.

The database migration tool 180 may facilitate such a database migration. For example, FIG. 2 is an example 200 of a database migration tool instance 210. The instance 210 includes a SCHEMA_VERSION table 220 listing which update versions 230 have already been applied to the database. In the example 200 of FIG. 2, update versions 230 entitled "Version 1_0" and "Version 1_1" have already be applied and will not need to be re-applied (and are thus crossed-out in FIG. 2). The remaining update versions 230 ("Version 1_2," "Version 2_0," and "Version 2_1") have not yet been applied and may be executed, in order, by the database migration tool to bring a database up-to-date.

Figure 3:
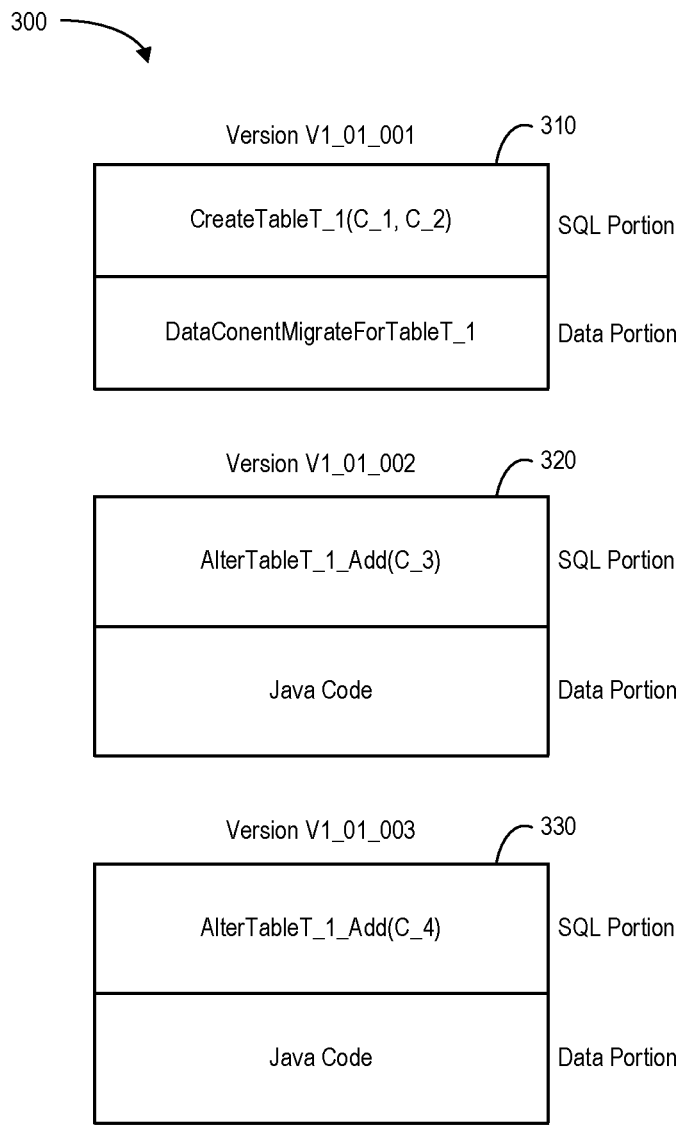
FIG. 3 is an example of hybrid database version upgrade migrations according to some embodiments.

FIG. 3 is an example 300 of hybrid database version upgrade migrations 310, 320, 330 according to some embodiments. Note that each version migration 310, 320, 330 may include both an SQL portion (to change the schema) and a data portion (e.g., a Java migration). For example, the first upgrade migration 310 (version "V1_01_001") includes a "Create Table T_1" SQL portion and a DataContentMigrateForTableT_1" data portion (which cannot be written as an SQL statement directly).

A simple sequential execution of the upgrade migrations 310, 320, 330 may cause several problems. For example, execution of the "Create Table T_1" SQL portion will place the database into a first state. Execution of the DataContentMigrateForTableT_1" data portion will place the database into a second state, and execution of the AlterTableT_1_Add(C_3) will add a third column to the database placing it into a third state. Generally, in an advanced cloud solution, a logic layer may use a framework (e.g., IBatis, Hibrate, Spring, etc.) to query the database instead of using Java Database Connectivity ("JDBC") directly. As a result, Java code and application database schema may always need to be consistent. For example, the binary associated with the third database state requires column C_3 to exist in the database. When the version migrations 310, 320, 330 are executed in order, execution of DataContentMigrateForTableT_1 may fail. For example, when querying T_1 from the database the database framework may generate an SQL such as "SELECT C_1, C_2, C_3 FROM T_1," in which case a runtime exception will be thrown because column C_3 does not yet exist in T_1. That is, column C_3 won't be added to table T_1 until the V1_01_002 migration is performed. This kind of error can be difficult to find until a real migration is actually run. Moreover, when a substantial number of versions are available, it can be impractical to test for these kinds of upgrade scenario combinations.

An additional problem with sequential execution of upgrade migrations 310, 320, 330 may arise when a migration fails in during a multi-tenant database migration. Note that some cloud solutions may let all tenants share a database and manage tenant level security in Java code. In order to achieve higher security, Data Service On Demand ("DSOD") may store application data of each tenant to a standalone schema, which might be located in different database servers. For a single schema migration, a transaction manager may provide a sufficient rollback mechanism. However, a transaction manager may not be able to manage rollbacks that cross multiple schemas, databases, and/or servers. Consider, for example, a scenario with tenant_1, tenant_2, and tenant_3. Each of these tenants has a standalone schema with the same name. Possible migration code may be as follows:

```
for (tenant in tenants){
    Transaction t;
    ...; // prepare transaction which only control
    try{
        tenant.migrate(...);
        t.commit( );
    }catch(Exception e){
        t.rollback( );
        throw e;
    }
}
```

In this case, if the migration of tenant_2 fails, the tenant_1 schema may be in the up-to-date version while tenant_2 and tenant_3 schema remain in a prior version, which may require a difficult manual fix to make all tenant schemas consistent again.

Figure 4:
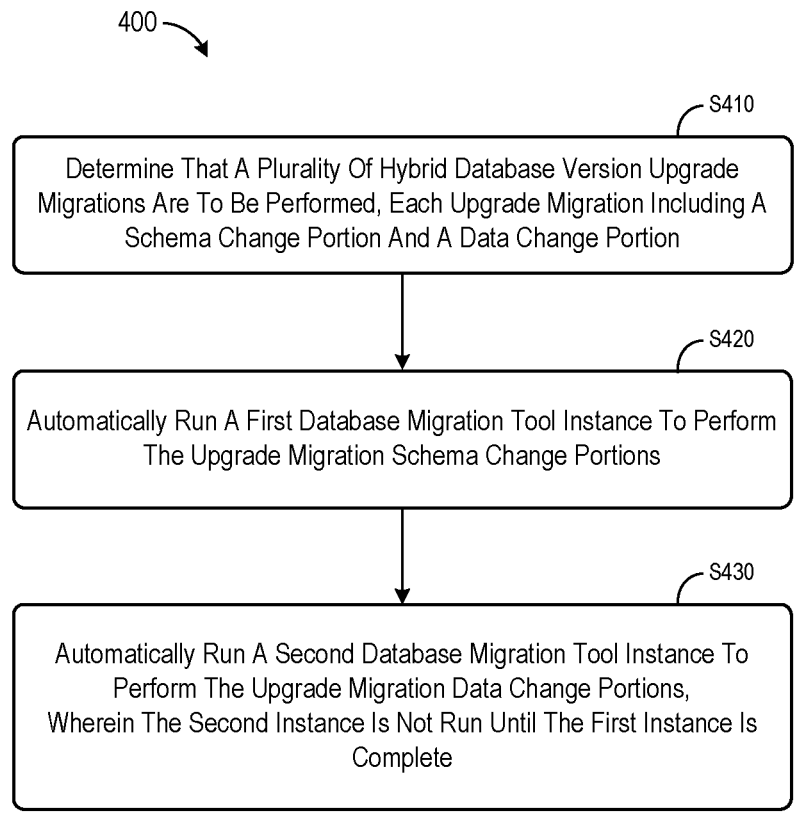
FIG. 4 is a flow diagram of a method in accordance with some embodiments described herein.

FIG. 4 is a flow diagram of a method in accordance with some embodiments described herein. The flow charts described herein do not imply a fixed order to the steps, and embodiments of the present invention may be practiced in any order that is practicable. Note that any of the methods described herein may be performed by hardware, software, or any combination of these approaches. For example, a computer-readable storage medium may store thereon instructions that when executed by a machine result in performance according to any of the embodiments described herein.

At S410, it may be determined that a plurality of hybrid database version upgrade migrations are to be performed, each upgrade migration including a schema change portion (e.g., an SQL portion) and a data change portion (e.g., a Java code portion). Note that hybrid database version upgrade migration might be associated with, for example, a development environment, a test environment, a production environment, an initial database version, a patch, a new release, and/or a new database feature. Moreover, embodiments may be associated with a cloud environment and/or a transaction manager that provide multi-tenant functionality for the hybrid database version upgrade migration. Note that the determination at S410 might be associated with, for example, a startup process, an administrator, a developer, a periodic process, and/or an arrival of a new hybrid database version upgrade migration.

At S420, a first database migration tool instance may be automatically run to perform the upgrade migration schema change portions. Similarly, at S430, a second database migration tool instance may be automatically run to perform the upgrade migration data change portions, wherein the second instance is not run until the first instance is complete. Note that the first and second instances may use independent metadata schema tables to track migrated versions. Moreover, each schema change portion and data change portion may be associated with a version number, and the first instance may perform the schema change portions in order based on the version number, beginning with the first version number that is not in the metadata schema table associated with the schema change portions. Likewise, the second instance may perform the data change portions in order based on the version number, beginning with the first version number that is not in the metadata schema table associated with the data change portions.

According to some embodiments, prior to running the instances at S420 and S430, the system may establish a schema change file repository to store schema change migration code, a data change file repository to store data change migration code, and an SQL file repository to store statements to be executed by the database migration tool. In some cases, the schema and/or data change file repositories may further store migration rollback code. If so, upon an exception associated with one of hybrid database version upgrade migrations, the migration rollback code may be executed such that all tenants in a multi-tenant implementation are associated with the same database version.

In this way, embodiments described herein may provide a relatively straightforward way to upgrade a database from any lower version (or from scratch) to any higher version.

Figure 5:
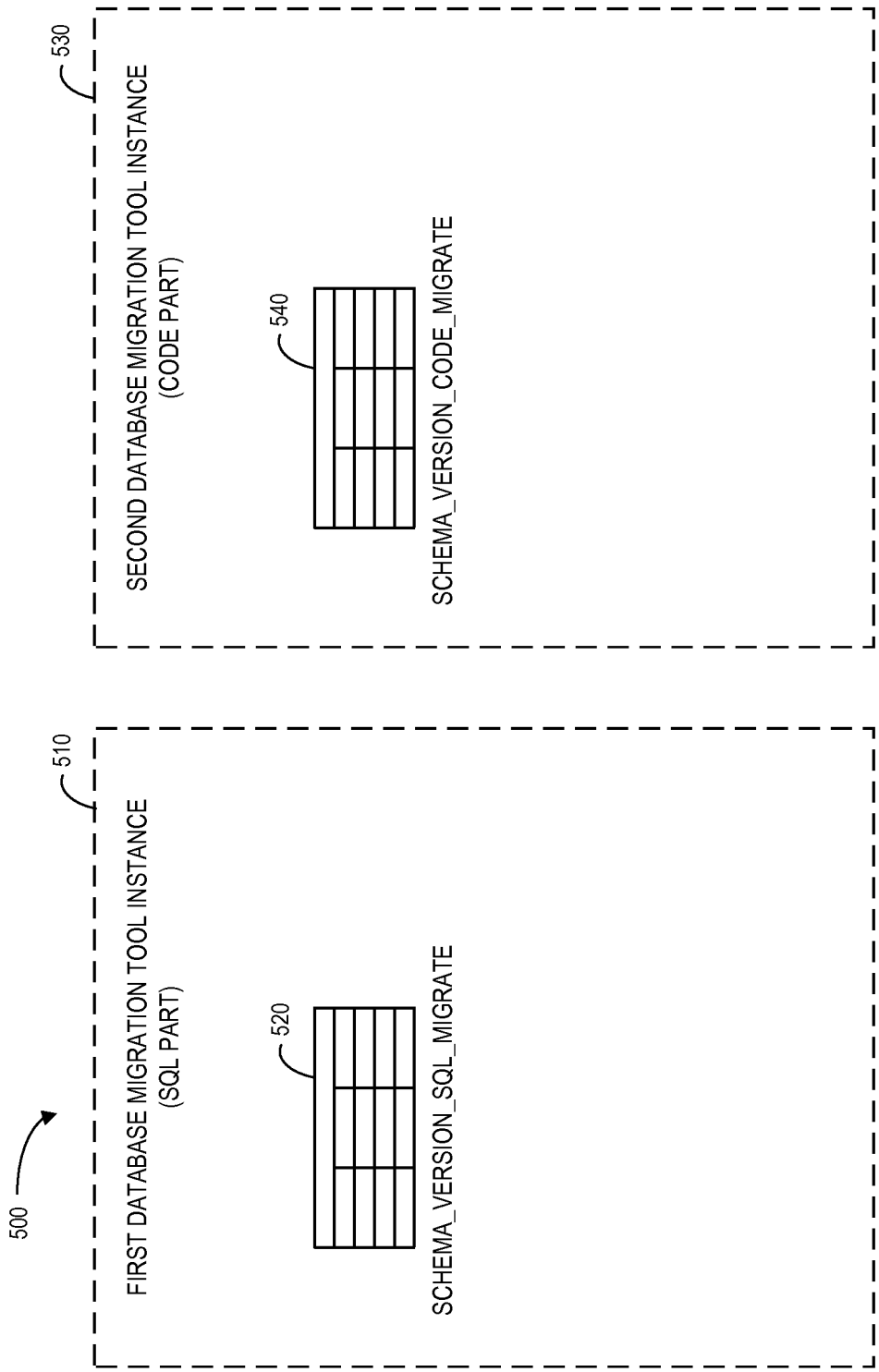
FIG. 5 is an example including two database migration tool instances according to some embodiments.

For example, two migration tool instances 510, 530 may be run as illustrated by the example 500 of FIG. 5. The first instance 510 may take care of SQL migration parts only while the second instance 530 takes care of Java migration parts. Since the Java migration parts depend on the first one, the second instance 530 might only be executed after the first instance 510 is done.

Note that the two instances 510, 530 may use two independent tables:
SCHEMA_VERSION_SQL_MIGRATE 520 and
SCHEMA_VERSION_CODE_MIGRATE 540
to track version migrations.

Figure 6:
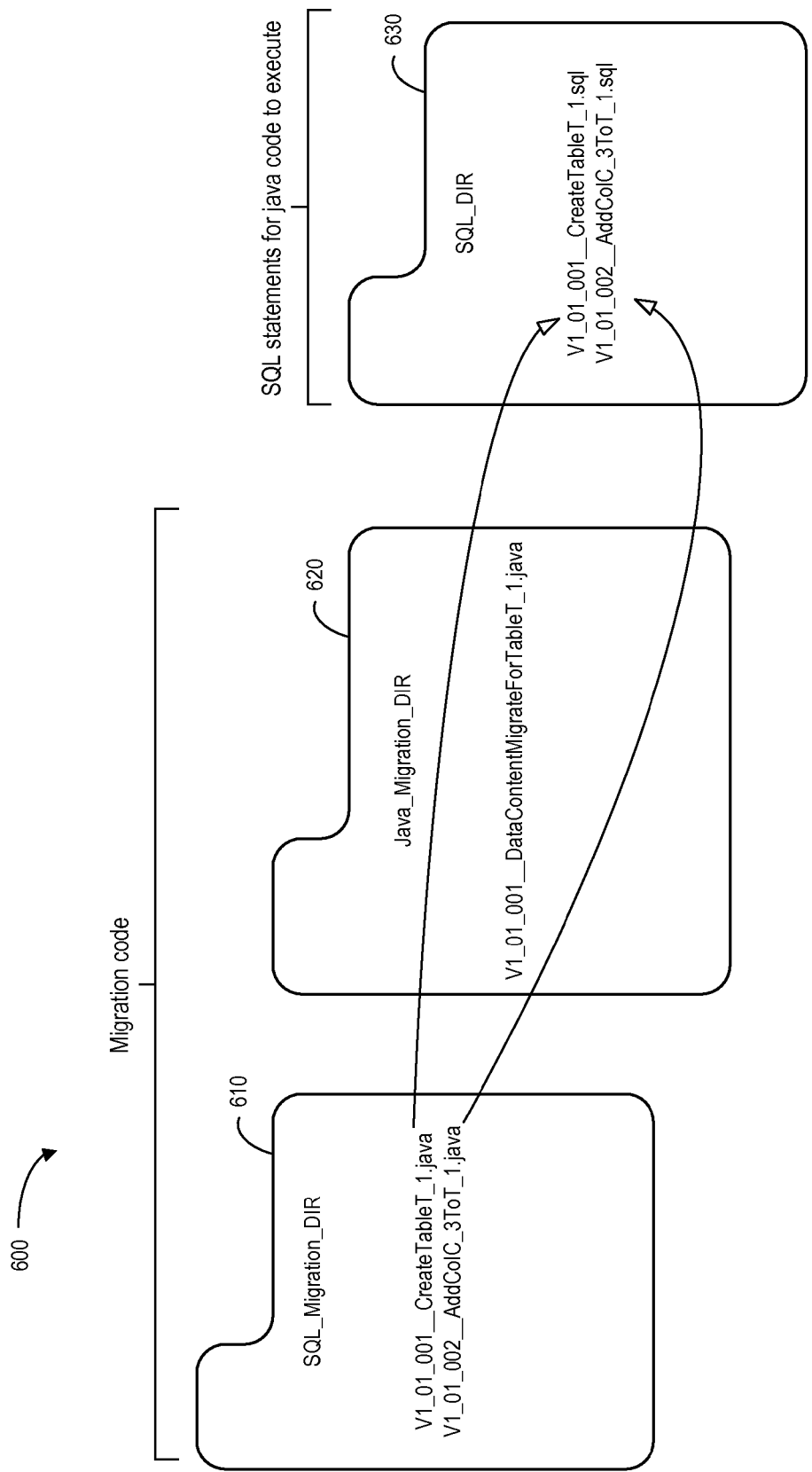
FIG. 6 is an example illustrating file repository structures in accordance with some embodiments.

FIG. 6 is an example 600 illustrating file repository structures in accordance with some embodiments. In particular, an SQL_Migration_DIR 610 and a Java_Migration_DIR 620 may be used to store migration code, and a SQL_DIR 630 may be used to store SQL statements for java code to execute. Note that statements in the SQL_Migration_DIR 610 may execute SQL files having the same name in the SQL_DIR 630 (as illustrated by arrows in FIG. 6).

Consider, as an example, updating a database from scratch to version V1_01_002. That is, both SCHEMA_VERSION_SQL_MIGRATE 520 and SCHEMA_VERSION_CODE_MIGRATE 540 are initially empty. In this case, a first database migration tool instance may then be run to process SQL_Migration_DIR 610. The java files may be executed sequentially, starting with the first java file not listed in the SCHEMA_VERSION_SQL_MIGRATE 520. For example, "V1_01_001_CreateTableT_1.java" may place the database in the first database state described with respect to FIG. 3. Moreover, "V1_01_001" may be added to SCHEMA_VERSION_SQL_MIGRATE 520. Next, "V1_01_002_AddColC_3ToT_1.java" will create the third database state described with respect to FIG. 3. In addition "V1_01_002" may be added to SCHEMA_VERSION_SQL_MIGRATE 520.

After the first database migration tool instance completes, a second instance may be run to process Java_Migration_DIR. The java files may again be executed sequentially, starting with the first java file not listed in the SCHEMA_VERSION_CODE_MIGRATE 540. For example, "V1_01_001_DataConentMigrateForTableT_1.java" may place the database in the second database state described with respect to FIG. 3. Moreover, "V1_01_001" may be added to SCHEMA_VERSION_CODE_MIGRATE 540.

According to some embodiments, developers may provide a rollback SQL file associated with each SQL migration part. For example, V1_01_002_AddColC_3ToT_1.sql and V1_0_01_002_AddColC_3ToT_1_rollback.sql might both exist in SQL_DIR 630. As another example, if an upgrade SQL has "ALTER TABLE T_1 ADD(C_1 . . . );", the rollback SQL might have "ALTER TABLE T_1 DROP (C_1);".

In a java class extending the database migration tool, the following logic might be provided to support version rollbacks:

```
private List<Organization> migratedOrgs;
public void migrateSQL(List<SQL> upgradingSQL, List<SQL>
rollbackSQL, List<Organization>
organizations) {
    for(Organization org : organizations){
        TransactionManager manager = ...; // init transaction
manager applying to a special tenant schema
        try{
            executeSQL(upgradingSQL, org);
            manager.commit( );
            migratedOrg.add(org);
        }catch(Exception e){
            manager.rollback( );
            for(Organization migratedOrg : migratedOrgs){
                executeSQL(rollbackSQL, org);
            }
            throw e;
        }
    }
}
```

When a column or a table is deleted which is used by the java code of an earlier version of SCHEMA_VERSION_CODE MIGRATE 540, a Java compiler may capture this incompatible and a developer can address the situation in implementation stage. Such an approach may be substantially less than dealing with an exception thrown after the database is deployed. Similarly, developers may be instructed that a column can only be altered from a smaller volume to a bigger one (e.g., from varchar(100) to varchar (1000)) to avoid migration process problems.

Figure 7:
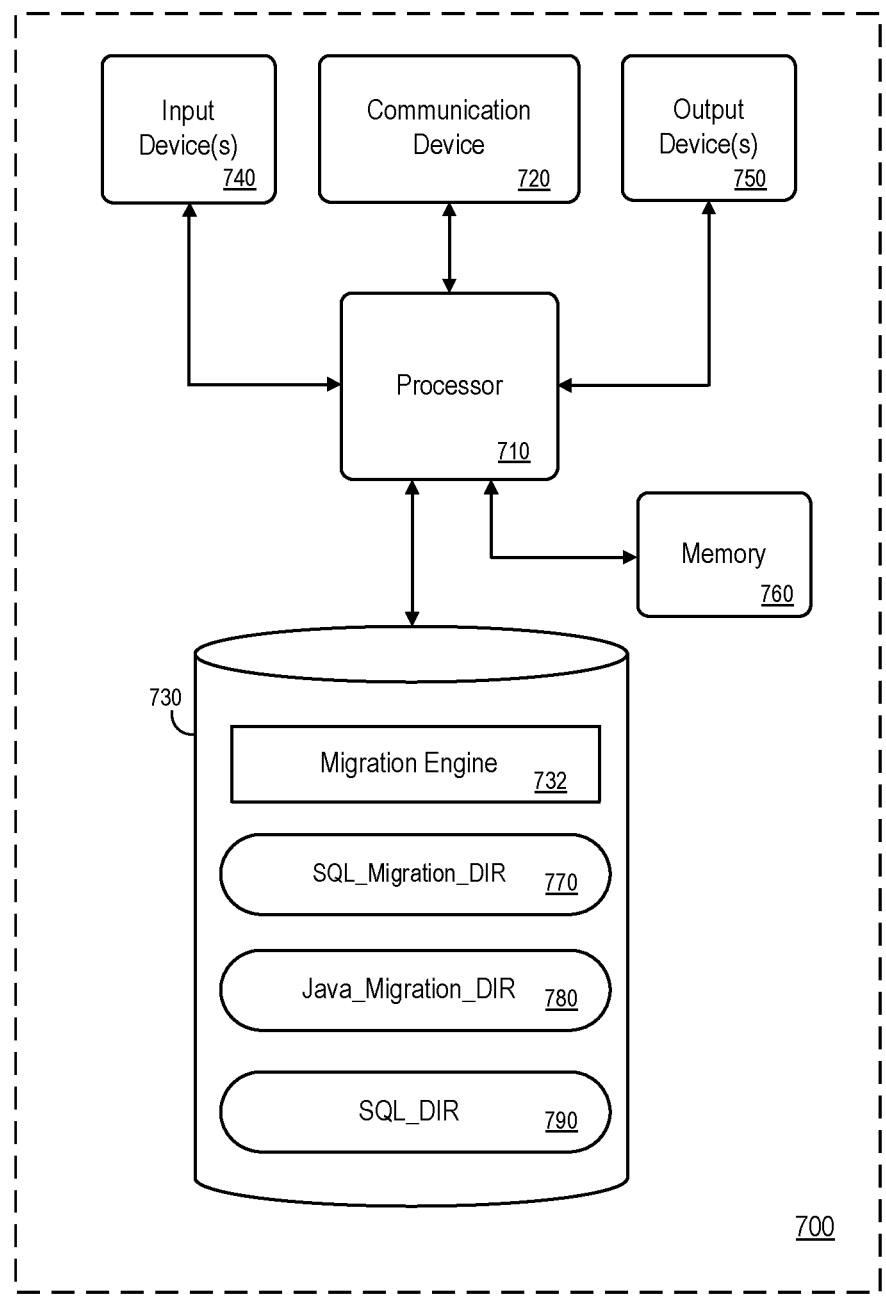
FIG. 7 is an apparatus in accordance with some embodiments described herein.

FIG. 7 is a block diagram of an apparatus 700 according to some embodiments. The apparatus 700 may comprise a general-purpose computing apparatus and may execute program code to perform any of the functions described herein. The apparatus 700 may include other unshown elements according to some embodiments.

The apparatus 700 includes a processor 710 operatively coupled to a communication device 720, a data storage device 730, one or more input devices 740, one or more output devices 750 and a memory 760. The communication device 720 may facilitate communication with external devices, such as a remote client or database device. The input device(s) 740 may comprise, for example, a keyboard, a keypad, a computer mouse or other pointing device, a microphone, an infra-red (IR) port, a docking station, and/or a touch screen. The input device(s) 740 may be used, for example, to enter information about upgrade migrations into apparatus 700. The output device(s) 750 may comprise, for example, a display (e.g., a display screen) a speaker, and/or a printer and may be used to generate logs, reports, etc.

The data storage device 730 may comprise any appropriate persistent storage device, including combinations of magnetic storage devices (e.g., magnetic tape, hard disk drives and flash memory), optical storage devices, Read Only Memory ("ROM") devices, etc., while memory 760 may comprise Random Access Memory ("RAM").

Program code of a migration engine 732 may be executed by the processor 710 to cause the apparatus 700 to perform any one or more of the processes described herein. Embodiments are not limited to execution of these processes by a single apparatus. The data storage device 730 may also store data and other program code for providing additional functionality and/or which are necessary for operation thereof, such as device drivers, operating system files, etc. For example, the processor 710 may determine that a plurality of hybrid database version upgrade migrations are to be performed, each upgrade migration including a schema change portion and a data change portion. The processor 710 may then run a first database migration tool instance to perform the upgrade migration schema change portions. The processor 710 may also run a second database migration tool instance to perform the upgrade migration data change portions, wherein the second instance is not run until the first instance is complete.

Note that the data storage device 730 may further store SQL_Migration_DIR 770, Java_Migration_DIR 780, and SQL_DIR 790.

Figure 8:
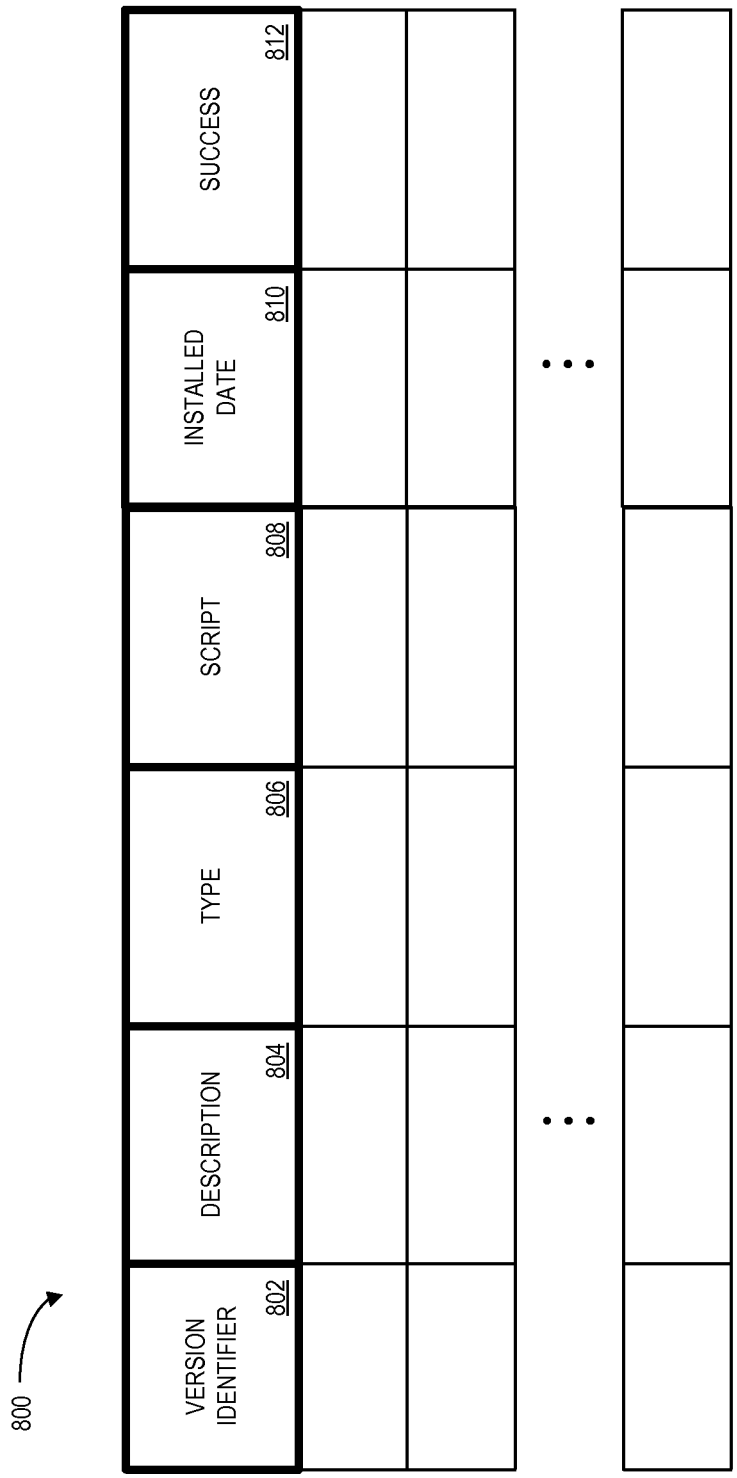
FIG. 8 is an example of a tabular data structure that may be associated with some embodiments described herein.

Referring to FIG. 8, a table is shown that represents a schema version database 800 that may be stored for an SQL portion instance or code portion instance according to some embodiments. The table may include, for example, entries identifying versions that have already been applied to the database (e.g., that do not need to be re-applied). The table may also define fields 802, 804, 806, 808, 810, 812 for each of the entries. The fields 802, 804, 806, 808, 810, 812 may, according to some embodiments, specify: a version identifier 802, a description 804, a type 806, a script 808, an installed date 810, and a success 812 indication. The scheme version database 800 may be created and updated, for example, by a database migration tool based on upgrades that have been applied to a database.

The version identifier 802 may be, for example, a unique alphanumeric code identifying an upgrade. The version identifier 802 may be used, for example, to select which updates will be applied to a database. The description 804 may described the update and the type 806 might indicate, for example, if the update is associated with the database scheme or data. The script 808 might be an SQL statement and the installed date 810 might indicate when the SQL statement was executed. The success indication 812 might indicate that the upgrade was successfully applied or that a problem occurred in connection with the migration.

The foregoing diagrams represent logical architectures for describing processes according to some embodiments, and actual implementations may include more or different components arranged in other manners. Other topologies may be used in conjunction with other embodiments. Moreover, each system described herein may be implemented by any number of devices in communication via any number of other public and/or private networks. Two or more of such computing devices may be located remote from one another and may communicate with one another via any known manner of network(s) and/or a dedicated connection. Each device may comprise any number of hardware and/or software elements suitable to provide the functions described herein as well as any other functions. For example, any computing device used in an implementation of the system 100 may include a processor to execute program code such that the computing device operates as described herein.

All systems and processes discussed herein may be embodied in program code stored on one or more computer-readable media. Such media may include, for example, a floppy disk, a CD-ROM, a DVD-ROM, a Flash drive, magnetic tape, and solid state Random Access Memory (RAM) or Read Only Memory (ROM) storage units.

Embodiments are therefore not limited to any specific combination of hardware and software.

Elements described herein as communicating with one another are directly or indirectly capable of communicating over any number of different systems for transferring data, including but not limited to shared memory communication, a local area network, a wide area network, a telephone network, a cellular network, a fiber-optic network, a satellite network, an infrared network, a radio frequency network, and any other type of network that may be used to transmit information between devices. Moreover, communication between systems may proceed over any one or more transmission protocols that are or become known, such as Asynchronous Transfer Mode ("ATM"), Internet Protocol ("IP"), Hypertext Transfer Protocol ("HTTP") and Wireless Application Protocol ("WAP").

Embodiments described herein are solely for the purpose of illustration. Those in the art will recognize other embodiments may be practiced with modifications and alterations to that described above.

What is claimed is:

1. A method, comprising:
    determining that a plurality of hybrid database version upgrade migrations is to be performed, each upgrade migration including a schema change portion and a data change portion;
    automatically (i) running a first database migration tool instance to perform the upgrade migration schema change portions, the first database migration tool instance comprising a first metadata schema version table to indicate update versions and (ii) executing updates beginning with a first schema version number that is not in the first metadata schema table to update a database schema;
    automatically running a second database migration tool instance to perform the upgrade migration data change portions, the second database migration tool instance comprising a second metadata schema version table, wherein the second metadata schema version table comprises data update version numbers that have an associated java script; and
    performing an upgrade, via the second database migration tool instance, using the data change portions in order based on version numbers by executing the associated java script, beginning with a first data version number that is not in the second metadata schema table associated with the data change portions, wherein the second instance is not run until the first instance is complete and wherein in a case that the first schema version number indicates a column is to be altered, preventing the column from being altered from a bigger volume to a smaller volume.

2. The method of claim 1, wherein each schema change portion and data change portion is associated with a version number,
    the first instance performs the schema change portions in order based on the associated version number, beginning with the first version number that is not in the metadata schema table associated with the schema change portions, and
    the second instance performs the data change portions in order based on the associated version number, beginning with the first version number that is not in the metadata schema table associated with the data change portions.

3. The method of claim 1, wherein the schema portions comprise structured query language portions.

4. The method of claim 1, wherein the data portions comprise Java code portions.

5. The method of claim 1, wherein the hybrid database version upgrade migration is associated with a cloud environment.

6. The method of claim 5, wherein a transaction manager provides multi-tenant functionality for the hybrid database version upgrade migration.

7. The method of claim 6, further comprising, prior to running the instances:
    establishing a schema change file repository to store schema change migration code;
    establishing a data change file repository to store data change migration code; and
    establishing a structured query language file repository to store statements to be executed by the database migration tool.

8. The method of claim 7, wherein the schema or data change file repositories further store migration rollback code.

9. The method of claim 8, further comprising:
    upon an exception associated with one of the hybrid database version upgrade migrations, executing the migration rollback code such that all tenants are associated with the same database version.

10. The method of claim 1, wherein said determining is associated with at least one of: (i) a startup process, (ii) an administrator, (iii) a developer, (iv) a periodic process, and (v) an arrival of a new hybrid database version upgrade migration.

11. The method of claim 1, wherein the hybrid database version upgrade migration is associated with at least one of: (i) a development environment, (ii) a test environment, (iii) a production environment, (iv) an initial database version, (v) a patch, (vi) a new release, and (vii) a new database feature.

12. A non-transitory computer-readable medium storing program code, the program code executable by a computer processor to perform a method, wherein the method comprises:
    determining that a plurality of hybrid database version upgrade migrations is to be performed, each upgrade migration including a schema change portion and a data change portion;
    automatically (i) running a first database migration tool instance to perform the upgrade migration schema change portions, the first database migration tool instance comprising a first metadata schema version table to indicate update versions and (ii) executing updates beginning with a first schema version number that is not in the first metadata schema table to update a database schema;
    automatically running a second database migration tool instance to perform the upgrade migration data change portions, the second database migration tool instance comprising a second metadata schema version table, wherein the second metadata schema version table comprises data update version numbers and an associated java script; and
    performing an upgrade, via the second database migration tool instance, using the data change portions in order based on version numbers by executing the associated java script, beginning with a first data version number that is not in the second metadata schema table associated with the data change portions, wherein the second instance is not run until the first instance is complete and wherein in a case that the first schema version number indicates a column is to be altered, preventing the column from being altered from a bigger volume to a smaller volume.

13. The medium of claim 12, wherein the two instances use independent metadata schema tables to track migrated versions, and each schema change portion and data change portion is associated with a version number,
   the first instance performs the schema change portions in order based on the associated version number, beginning with the first version number that is not in the metadata schema table associated with the schema change portions, and
   the second instance performs the data change portions in order based on the associated version number, beginning with the first version number that is not in the metadata schema table associated with the data change portions.

14. The medium of claim 12, wherein the schema portions comprise structured query language portions and the data portions comprise Java code portions.

15. The medium of claim 12, wherein the hybrid database version upgrade migration is associated with a cloud environment and a transaction manager provides multi-tenant functionality for the hybrid database version upgrade migration.

16. A system, comprising:
   a storage device to store a plurality of hybrid database version upgrade migrations, each upgrade migration including a schema change portion and a data change portion; and
   a computer processor coupled to the storage device and configured to: (i) run a first database migration tool instance to perform the upgrade migration schema change portions, wherein the first database migration tool instance comprises a first metadata schema version table to indicate update versions, (ii) execute updates beginning with a first schema version number that is not in the first metadata schema table to update a database schema, (iii) run a second database migration tool instance to perform the upgrade migration data change portions, wherein the second database migration tool instance comprises a second metadata schema version table, wherein the second metadata schema version table comprises data update version numbers and an associated java script, and (iv) perform an upgrade, via the second database migration tool instance, using the data change portions in order based on version numbers by executing the associated java script, beginning with a first data version number that is not in the second metadata schema table associated with the data change portions, wherein the second instance is not run until the first instance is complete and wherein in a case that the first schema version number indicates a column is to be altered, preventing the column from being altered from a bigger volume to a smaller volume.

17. The system of claim 16, wherein the two instances use independent metadata schema tables to track migrated versions, and each schema change portion and data change portion is associated with a version number,
   the first instance performs the schema change portions in order based on the associated version number, beginning with the first version number that is not in the metadata schema table associated with the schema change portions, and
   the second instance performs the data change portions in order based on the associated version number, beginning with the first version number that is not in the metadata schema table associated with the data change portions.

18. The system of claim 16, wherein the schema portions comprise structured query language portions and the data portions comprise Java code portions.

19. The system of claim 16, wherein the hybrid database version upgrade migration is associated with a cloud environment and a transaction manager provides multi-tenant functionality for the hybrid database version upgrade migration.

* * * * *